(12) United States Patent
Furman et al.

(10) Patent No.: US 7,125,441 B1
(45) Date of Patent: Oct. 24, 2006

(54) CORROSION INHIBITING MATERIALS FOR REDUCING CORROSION IN METALLIC CONCRETE REINFORCEMENTS

(75) Inventors: Alla Furman, Shoreview, MN (US); Margarita Kharshan, Little Canada, MN (US); Boris A. Miksic, North Oaks, MN (US); Arthur H. Ahlbrecht, Stillwater, MN (US)

(73) Assignee: Cortec Corporation, St. Paul, MN (US)

( * ) Notice: Subject to any disclaimer, the term of this patent is extended or adjusted under 35 U.S.C. 154(b) by 0 days.

(21) Appl. No.: 11/060,690

(22) Filed: Feb. 17, 2005

(51) Int. Cl.
*C23F 11/00* (2006.01)
*C23F 15/00* (2006.01)
*C04B 24/06* (2006.01)
*C04B 103/61* (2006.01)

(52) U.S. Cl. .............. 106/14.42; 106/14.13; 106/14.41; 106/14.44; 106/640; 106/641; 106/642; 106/643; 106/644

(58) Field of Classification Search ............. 106/14.13, 106/14.41, 14.42, 14.44, 640, 641, 642, 643, 106/644
See application file for complete search history.

(56) References Cited

U.S. PATENT DOCUMENTS

| | | | |
|---|---|---|---|
| 2,744,831 A | | 5/1956 | McCoy et al. |
| 3,690,949 A | * | 9/1972 | Ng .................................. 134/2 |
| 3,826,665 A | | 7/1974 | Hovasse et al. |
| 4,092,109 A | * | 5/1978 | Rosenberg et al. ............. 422/7 |
| 4,365,999 A | * | 12/1982 | Fujita et al. ................. 106/644 |
| 4,442,021 A | * | 4/1984 | Burge et al. ................. 252/390 |
| 4,466,834 A | | 8/1984 | Dodson et al. |
| 5,039,556 A | | 8/1991 | Cogliano et al. |
| 5,050,549 A | * | 9/1991 | Sturmon .................. 123/198 E |
| 5,071,582 A | * | 12/1991 | Conville et al. ............. 510/184 |
| 5,422,141 A | | 6/1995 | Hoopes et al. |
| 5,527,388 A | | 6/1996 | Berke et al. |
| 5,597,514 A | | 1/1997 | Miksic et al. |
| 5,634,966 A | | 6/1997 | Berke et al. |
| 5,656,075 A | | 8/1997 | Gaidis et al. |
| 5,750,053 A | | 5/1998 | Miksic et al. |
| 5,755,876 A | | 5/1998 | Stokes et al. |
| 5,985,011 A | | 11/1999 | Foltz et al. |
| 6,022,408 A | | 2/2000 | Stokes et al. |
| 6,033,553 A | | 3/2000 | Bennett |
| 6,071,436 A | | 6/2000 | Incorvia |
| 6,174,461 B1 | | 1/2001 | Miksic et al. |
| 6,217,742 B1 | | 4/2001 | Bennett |
| 6,340,438 B1 | | 1/2002 | Lane et al. |
| 6,342,101 B1 | | 1/2002 | Miksic et al. |
| 6,402,990 B1 | | 6/2002 | Marazzani et al. |
| 6,500,254 B1 | | 12/2002 | Baxter et al. |
| 6,524,465 B1 | | 2/2003 | Ashida et al. |
| 6,627,065 B1 | | 9/2003 | MacDowell et al. |

FOREIGN PATENT DOCUMENTS

| | | | |
|---|---|---|---|
| EP | 0614860 A1 | * | 9/1994 |
| JP | 54-32145 A | * | 3/1979 |
| WO | WO 2004/044267 | | 5/2004 |

* cited by examiner

*Primary Examiner*—Anthony J. Green
(74) *Attorney, Agent, or Firm*—Haugen Law Firm PLLP

(57) ABSTRACT

A corrosion inhibiting composition for use in reinforced concrete structures, the inhibitor composition reducing the rate of corrosion in metallic reinforcing rods placed within the structures. The composition includes a combination of one or more corrosion inhibiting agents and one or more silica neutralizing agents.

10 Claims, No Drawings

CORROSION INHIBITING MATERIALS FOR REDUCING CORROSION IN METALLIC CONCRETE REINFORCEMENTS

FIELD OF THE INVENTION

The present invention relates generally to corrosion inhibiting materials for use in reinforced concrete structures, and more particularly to materials incorporating one or more corrosion inhibiting agents and one or more silica neutralizing agents for reducing the rate of corrosion in metallic reinforcing rods placed within structures formed of concrete. The materials of the present invention are designed for use either in admixture with raw concrete when provided on an in-situ basis within the concrete mixing, or alternatively may be effectively utilized as surface treatments on existing concrete structures having corrosion-susceptible elements disposed therewithin. Preferably, the materials of present invention do not adversely affect the performance characteristics of the concrete.

BACKGROUND OF THE INVENTION

Concrete structures, particularly highways and bridges, typically utilize metallic reinforcement members embedded therewithin to provide stability and additional strength to the concrete, as well as to enhance the ability of the concrete to withstand shear forces. These reinforcements are used in a variety of configurations, and are typically present in the form of reinforcing rods, wire mesh, metallic fibers, and the like. Reinforcements are usually situated within the cured concrete by pouring raw or uncured concrete therearound or, in the case of metallic fibers, added during the concrete mixing operation for subsequent curing. The term "raw concrete" is utilized herein in a comprehensive sense, and is intended to relate to wet workable concrete mixtures which have not yet cured to their solid form.

Upon the passage of time, the metallic reinforcements have a tendency to corrode as external elements including moisture and pollutants such as carbon dioxide, oxides of sulfur, oxides of nitrogen, hydrogen sulfide, and road treatment chemicals permeate along and through the concrete structure and reach the surface of the metal reinforcement. When utilized, for example, in highways, bridges, and parking structures, chlorides including sodium chloride and calcium chloride may permeate the concrete structure due to the widespread utilization of such materials as a mechanism to melt ice and snow from the road surfaces. Both calcium chloride and sodium chloride are widely used for this purpose, and their use, although necessary for safety reasons, has been linked to the rapid deterioration of certain concrete structures.

A characteristic of common concrete mixtures that exacerbates corrosion of, for example, metallic elements embedded within a mass of concrete is alkaline silica reactivity (ASR), a condition in which alkali in cement attacks silica-based aggregates to form gels that can absorb water. Such water absorption can lead to crack formation in the concrete mass due to freeze-thaw cycles, as well as the reception and retention of moisture adjacent to metallic elements that may corrode in the presents of water. One approach to reduce and/or eliminate the alkaline silica reactivity in concrete admixtures is through the use of lithium salts such as lithium nitrate to neutralize the silica found in common concrete admixture recipes. An example of the use of lithium salts to thwart alkaline silica reactivity in concrete mixtures is found in WO 04044267 published in the name of the Virginia Transportation Research Counsel. Though the use of lithium salts has proven to be beneficial in minimizing alkaline silica reactivity in concrete mixtures, such utility alone does not provide a total preventative and/or restorative corrosion protection solution for corrosion-susceptible elements disposed in concrete mixtures.

In order to facilitate the access of corrosion inhibiting materials to concrete reinforcements, it is normally desirable for such materials to be added to the raw concrete mixture in order to provide for contact with the surfaces of the metallic reinforcement members or structures prior to concrete curing. The corrosion inhibiting materials added in this fashion normally migrate throughout the concrete mixture at a rate sufficient to provide ongoing protection over relatively extended periods of time, and hence have the ability to protect the metallic reinforcements over such extended periods of time.

In other embodiments however, such corrosion inhibiting materials need to be applied to cured concrete structures having corrosion-susceptible reinforcements encased therewithin. As such, the corrosion inhibiting materials are preferably applied to the surface of the concrete structure and thereafter migrate inwardly to protect the surface of the metallic reinforcements.

As a further aspect of corrosion inhibiting materials, it is a common objective to utilize ecologically friendly components wherever possible. In this connection, the formulation of the present invention preferably provides for the use of ecologically friendly materials, and thus the goals and objectives of inhibiting corrosion in large structures can be undertaken without significantly contributing to the release of ecologically harmful products into the environment.

In view of the above, it is therefore a principal object of the present invention to provide a corrosion inhibiting composition that may be applied to raw or cured concrete mixtures for protecting corrosion-susceptible elements disposed within such concrete mixtures, with the corrosion inhibiting composition incorporating one or more alkaline silica reactivity suppression agents and one or more corrosion inhibiting agents.

It is a further object of the present invention to provide a corrosion inhibiting composition having the capability to migrate within cured concrete mixtures along the surface of embedded corrosion-susceptible elements so as to provide corrosion protection thereto over a prolonged period of time.

It is a further object of the present invention to provide a corrosion inhibiting composition comprising ecologically friendly components.

It is a still further object of the present invention to provide a corrosion inhibiting composition for protection of metallic reinforcements embedded within concrete mixtures without adversely affecting the curing rate or ultimate strength of the respective concrete mixtures.

Other objects of the present invention will become apparent to those skilled in the art upon a study of the following specification and appended claims.

SUMMARY OF THE INVENTION

In accordance with the present invention, a formulation has been developed which is readily adapted for use in admixture with raw or wet concrete mixtures, as well as in surface treatment of formed concrete structures, and which provides long-lasting and reliable corrosion inhibiting properties for metallic reinforcements. When employed in admixture with raw concrete, the formulations of the present invention provide the dual function of corrosion inhibition and controlling expansion from the alkali silica reaction.

In a particular embodiment, the corrosion inhibiting composition of the present invention includes a combination of one or more corrosion inhibiting agents and one or more silica neutralizing agents. Preferably, the silica neutralizing agents include between about 5% and about 30% by weight of one or more gluconate salts, and between 2.5% and 40% by weight of one or more nitrate salts. The corrosion inhibiting agents are preferably presents in the composition of the present invention at a concentration of between about 1% and about 20% by weight.

DETAILED DESCRIPTION OF THE PREFERRED EMBODIMENTS

The objects and advantages enumerated above together with other objects, features, and advances represented by the present invention will now be presented in terms of detailed embodiments. Other embodiments and aspects of the invention are recognized as being within the grasp of those having ordinary skill in the art.

The present invention is specifically directed to corrosion inhibiting compositions that employ one or more corrosion inhibiting agents and one or more silica neutralizing agents to suppress alkaline silica reactivity in concrete mixtures. Particular silica neutralizing agents useful in the compositions of the present invention include gluconate salts and/or nitrate salts. Examples of gluconate salts known to be useful in the compositions of the present invention include sodium gluconate, zinc gluconate, potassium gluconate, and ammonium gluconate. Examples of nitrate salts useful in the compositions of the present invention include lithium nitrate, calcium nitrate, and aluminum nitrate. The above examples, however, are not intended to be comprehensive of those materials useful as silica neutralizing agents in the present invention, but rather to provide specific components readily known to be useful as silica neutralizing agents.

In some embodiments for the present invention, mixtures of gluconate salts and nitate salts are used as the silica neutralizing agents in an amount ranging from 5% to 30% by weight gluconate salts, and 2.5% to 40% nitrate salts. Generally, and for most purposes, a ratio of between about 5% by weight and 30% by weight gluconate salts is preferred, with a specific formulation of 25% by weight gluconate salts having been found to be highly effective.

To complete the corrosion inhibiting composition solutions of the present invention, known corrosion inhibitors such as, for example, amino alcohols, amino silane, amine salts, and amino carboxylates such as ammonium benzoate are added. Such corrosion inhibiting materials are disclosed in, for example, U.S. Pat. Nos. 5,597,514 and 5,750,053, which are assigned to the same assignee as in the present application, and are incorporated herein by reference. Preferably, such corrosion inhibitors are added to the solution at a concentration of between about 1% and 20% by weight, with a range of between 2.5 and 10% by weight of the solution being most preferred. The solutions of the present invention therefore preferably include between 5 and 30% by weight gluconate salts, between 2.5% and 40% by weight nitrate salts, and between 1% and 20% by weight corrosion inhibiting agents, balance water When added to raw or wet concrete, an amount of between about 16 ounces and 96 ounces of solution per cubic yard of raw concrete has been found highly effective, although amounts as low as 5 ounces of inhibiting solution per cubic yard of raw concrete have also been found to be useful.

The following examples provide various particular embodiments of the inhibiting composition solutions of the present invention. It is contemplated that such compositions represent exemplary formulations only, and that many other formulations incorporating the components of the present invention may be derived with successful results, and are within the scope of the present invention:

EXAMPLE I

A corrosion inhibiting solution was prepared in accordance with the following formulation:

| Component | Percent by Weight |
| --- | --- |
| Sodium Glucoheptonate | 8.5% by weight |
| Cyclohexylammonium benzoate | 1.25% by weight |
| Ethylammonium benzoate | 1.25% by weight |
| Calcium nitrate | 55% by weight |
| Water | 34% by weight |

This formulation is provided in admixture with raw concrete in an amount of 64 ounces by weight per cubic yard of concrete for inhibiting the corrosion of metallic reinforcements.

EXAMPLE II

A corrosion inhibiting solution was prepared in accordance with the following formulation:

| Component | Percent by Weight |
| --- | --- |
| Sodium glucoheptonate | 8.5% by weight |
| Ethylammonium benzoate | 1.25% by weight |
| Cyclohexylammonium benzoate | 1.25% by weight |
| Lithium nitrate | 24% by weight |
| Water | 65% by weight |

This formulation is provided in admixture with raw concrete in an amount of 64 ounces by weight per cubic yard of raw concrete for inhibiting the corrosion of metallic reinforcements.

EXAMPLE III

A corrosion inhibiting solution was prepared in accordance with the following formulation:

| Component | Percent by Weight |
| --- | --- |
| Sodium gluconate | 17.5% by weight |
| Ammonium Benzoate | 2.5% by weight |
| Lithium Nitrate | 26% by weight |
| Water | 54% by weight |

This formulation was provided in admixture with raw concrete in an amount of 64 ounces by weight per cubic yard of raw concrete for inhibiting the corrosion of metallic reinforcements.

EXAMPLE IV

A corrosion inhibiting solution prepared in accordance with the following formulation was used as a control to determine the corrosion improvement resulting from the nitrate salts addition:

| Component | Percent by Weight |
| --- | --- |
| Sodium Glucoheptonate | 25% by weight |
| Ammonium benzoate | 10% by weight |
| Water | 65% by weight |

This formulation was provided in admixture with raw concrete in an amount of 32 ounces by weight per cubic yard of raw concrete for inhibiting the corrosion of metallic reinforcements. It is possible that if the dosage rate of this product was doubled the corrosion protection would be higher but the set time of the concrete would be excessive (see Table 1) and the amount of sodium introduced in the concrete would be excessive.

EXAMPLE V

A corrosion inhibiting solution was prepared in accordance with the following formulation:

| Component | Percent by Weight |
| --- | --- |
| Sodium Gluconate | 8.5% by weight |
| Cyclohexylammonium benzoate | 1.25% by weight |
| Ethylammonium benzoate | 1.25% by weight |
| Calcium nitrate | 13% by weight |
| Lithium nitrate | 9% by weight |
| Water | 67% by weight. |

This formulation is provided in admixture with raw concrete in an amount of 64 ounces by weight per cubic yard.

EXAMPLE VI

A corrosion inhibiting solution was prepared in accordance with the following formulation:

| Component | Percent by Weight |
| --- | --- |
| Sodium Gluconate | 9.5% by weight |
| Methylethanolamine | 2.0% by weight |
| Aluminum nitrate | 18% by weight |
| Cyclohexyl amine | 14% by weight |
| Benzoic acid | 3.5% by weight |
| Water | 53% by weight |

This formulation is provided in admixture with raw concrete in an amount of 64 ounces by weight per cubic yard.

EXAMPLE VII

A corrosion inhibiting solution was prepared in accordance with the following formulation:

| Component | Percent by Weight |
| --- | --- |
| Lithium nitrate | 25% by weight |
| Dimethylethanolamine | 2.5% by weight |
| Water | 72.5% by weight |

This formulation is provided in admixture with raw concrete in an amount of 64 ounces by weight per cubic yard.

TABLE 1

To evaluate set time samples were checked every 15 minutes.

| Material | Set Time |
| --- | --- |
| Example 1 | 3 hr 50 min |
| Example 2 | 3 hr 50 min |
| Example 3 | 3 hr 50 min |
| Example 4 | 5 hr 15 min |
| Example 5 | 3 hr 50 min |
| Example 6 | 3 hr 50 min |
| Example 7 | 2 hr 30 min |

Before impedance measurements were taken the molded concrete samples were cured at room temperature in a relative humidity of 95–98% for 28 days. After curing the samples were immersed in 3% NaCL solution for 20 hours.

TABLE 2

The samples were evaluated with Impedance testing (ASTM G106-89) as follows:
The working electrode was a cleaned carbon steel standard rebar embedded in mortar which was prepared with the inhibitor solution at the amount equivalent to either 32 ounces or 64 ounces per cubic yard of concrete.

| Material | Polarization Resistance $R_p$, ohm | Corrosion Current, Icorr. $\mu A/cm^2$ | Corrosion Rate, $\mu m/year$ | Z, Protection power, % |
| --- | --- | --- | --- | --- |
| Control | 2924 | .59 | 6.8 | — |
| Example 1 | 11403 | .15 | 1.7 | 75 |
| Example 2 | 24915 | .07 | .8 | 88.3 |
| Example 3 | 11473 | .15 | 1.7 | 75 |
| Example 4 | 6449 | .27 | 3.1 | 55 |
| Example 5 | 18550 | .09 | 1.0 | 85 |
| Example 6 | 53300 | .003 | 0.3 | 96 |
| Example 7 | 20602 | .10 | 1.15 | 83.1 |

The concentration of inhibitor corresponds to 4 lb per cubic yard for all of the samples except Number 4 which was 2 lb per cubic yard due to sodium and set time limitations.

Calculations were carried out using formulas:

$$Icorr = 26\ mV/(Rp * Surface\ area);$$

$$1\ \mu A/cm^2 = 11.6\ \mu m/year$$

$$Surface\ area = 15\ cm^2$$

$$Z = 100\% * (Icorr.Cont. - Icorr.)/Icorr.Cont$$

These results clearly indicate that gluconate salts such as sodium gluconate in combination with nitrate salts such as Ca(NO$_3$)$_2$ and LiNO$_3$, when used in compositions including corrosion inhibiting agents substantially decrease the corrosion rate of embedded metallic elements.

What is claimed is:

1. A corrosion inhibiting composition, comprising;
   (a) between about 8.5% and about 17.5% by weight of one or more gluconate salts;
   (b) between about 18% and about 26% by weight of one or more nitrate salts; and
   (c) between about 2.5% and about 19.5% by weight of one or more corrosion inhibiting agents selected from the group consisting of cyclohexylammonium benzoate, ethylammonium benzoate, ammonium benzoate, dimethylethanolamine, and combinations thereof.

2. A corrosion inhibiting composition as in claim 1 wherein said one or more gluconate salts are selected from the group consisting of zinc gluconate, potassium gluconate, ammonium gluconate, and combinations thereof.

3. A corrosion inhibiting composition as in claim 1 wherein said one or more nitrate salts are selected from the group consisting of lithium nitrate, calcium nitrate, aluminum nitrate, and combinations thereof.

4. A method for inhibiting corrosion of metallic elements disposed in concrete mixtures, said method comprising the steps of;
   (a) providing a corrosion inhibiting composition having:
     (i) between about 8.5% and about 17.5% by weight of one or more gluconate salts;
     (ii) between about 18% and about 26% by weight of one or more nitrate salts; and
     (iii) between about 2.5% and about 19.5% by weight of one or more corrosion inhibiting agents;
     (iv) balance water; and
   (b) adding said corrosion inhibiting composition to said concrete mixtures.

5. A method as in claim 4 wherein said concrete mixtures are pre-cured, wet concrete.

6. A method as in claim 4 wherein said concrete mixtures are in the form of cured concrete structures having one or more of said metallic elements embedded therein.

7. A method as in claim 4 wherein said corrosion inhibiting composition is added to said concrete mixtures at a concentration of between 16 and 96 ounces per cubic yard of concrete mixture.

8. A corrosion inhibiting composition for treatment of metallic elements disposed within concrete mixtures, said corrosion inhibiting composition comprising:
   (a) between about 8.5% and about 17.5% by weight sodium gluconate;
   (b) between about 18% and about 26% by weight aluminum nitrate; and
   (c) between about 2.5% and about 19.5% by weight of one or more corrosion inhibiting agents other than gluconate salts and nitrate salts.

9. A corrosion inhibiting composition consisting essentially of:
   (a) about 9.5% by weight sodium gluconate;
   (b) about 18% by weight aluminum nitrate;
   (c) about 19.5% by weight of one or more corrosion inhibiting agents; and
   (d) balance water.

10. A corrosion inhibiting composition as in claim 9 wherein said one or more corrosion inhibiting agents are selected from the group consisting of methylethanolamine, cyclohexylamine, and benzoic acid.

* * * * *